(12) United States Patent
Haga et al.

(10) Patent No.: US 7,785,223 B2
(45) Date of Patent: *Aug. 31, 2010

(54) OSCILLATING INTERNALLY MESHING PLANETARY GEAR REDUCER

(75) Inventors: Takashi Haga, Ohbu (JP); Jun Tamenaga, Ohbu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 667 days.

This patent is subject to a terminal disclaimer.

(21) Appl. No.: 11/730,077

(22) Filed: Mar. 29, 2007

(65) Prior Publication Data

US 2007/0232433 A1    Oct. 4, 2007

(30) Foreign Application Priority Data

Mar. 29, 2006  (JP)  ............................. 2006-090112
Apr. 4, 2006   (JP)  ............................. 2006-103379

(51) Int. Cl.
F16H 1/32 (2006.01)

(52) U.S. Cl. .................. 475/162; 475/178; 475/179

(58) Field of Classification Search ................ 475/162, 475/168–170

See application file for complete search history.

(56) References Cited

U.S. PATENT DOCUMENTS

| 6,508,737 B2 * | 1/2003 | Fujimoto | 475/178 |
| 6,517,460 B2 * | 2/2003 | Takeuchi et al. | 475/162 |
| 6,699,152 B2 * | 3/2004 | Tanaka | 475/149 |
| 2002/0066331 A1 * | 6/2002 | Okada et al. | 74/490.03 |
| 2004/0192486 A1 * | 9/2004 | Tsurumi et al. | 475/168 |
| 2004/0254042 A1 * | 12/2004 | Tsurumi | 475/163 |
| 2008/0045369 A1 * | 2/2008 | Tamenaga | 475/160 |
| 2008/0305908 A1 * | 12/2008 | Tamenaga | 475/162 |
| 2009/0118050 A1 * | 5/2009 | Takeuchi | 475/168 |
| 2009/0243297 A1 * | 10/2009 | Nohara et al. | 475/162 |
| 2009/0325753 A1 * | 12/2009 | Hirata | 475/162 |

FOREIGN PATENT DOCUMENTS

| JP | 2002-106650 | 4/2002 |
| JP | 2002-122190 | 4/2002 |
| JP | 2005-061519 | 3/2005 |

* cited by examiner

*Primary Examiner*—David D Le
*Assistant Examiner*—Derek D Knight
(74) *Attorney, Agent, or Firm*—Squire, Sanders & Dempsey, L.L.P.

(57) ABSTRACT

To provide an oscillating internally meshing planetary gear reducer capable of realizing a low cost and a high speed reduction ratio, the oscillating internally meshing type planetary gear reducer is constituted so as to include: an input shaft provided with an input gear which is circumscribed and meshed with a pinion provided on a motor; an input shaft gear formed on the input shaft; a plurality of eccentric body shafts each provided with an eccentric body for oscillating an oscillating external gear; an eccentric body shaft gear which is formed on each eccentric body shaft; and a distributing gear which is meshed with the input shaft gear and the eccentric body shaft gear.

12 Claims, 8 Drawing Sheets

Prior Art

Prior Art

Prior Art

OSCILLATING INTERNALLY MESHING PLANETARY GEAR REDUCER

BACKGROUND OF THE INVENTION

1. Field of the Invention

The present invention relates to an oscillating internally meshing planetary gear reducer.

2. Description of the Related Art

Geared motors 1, and 2 and 2' are conventionally known that are disclosed in Japanese Published Unexamined Patent Application Nos. 2002-106650 and 2002-122190 respectively.

FIG. 6 shows the geared motor 1 disclosed in Japanese Published Unexamined Patent Application No. 2002-106650. FIG. 7 shows the geared motor 2 disclosed in Japanese Published Unexamined Patent Application No. 2002-122190. FIG. 8 shows the geared motor 2' disclosed in Japanese Published Unexamined Patent Application No. 2002-122190. The same reference symbols are attached to the same or similar parts of each geared motor respectively, and each geared motor will be described.

Each geared motor includes: a motor 10 which serves as a power source; a pinion or pulley 14 provided on a motor shaft 12 of the motor 10; an eccentric body shaft 30 provided with an eccentric body 32 for oscillating an oscillating external gear 34; and a carrier body 38 (38A, 38B) for taking out a rotation component of the oscillating external gear 34. The carrier body 38 is pivotably supported by a casing 40 via a carrier body bearing 50 (50A, 50B).

In the geared motor 1, the pinion 14 meshes with a distributing gear 26 having a large diameter, and a small gear 26A integrated with the distributing gear 26 meshes with input gears 20 provided on three eccentric body shafts 30 (only one shaft 30 appears in FIG. 6). Additionally, the distributing gear 26 is rotatably supported by bearings 80 and 81.

In the geared motor 2, the pinion 14 directly meshes with one of input gears 20 provided on the eccentric body shaft 30 (only one of the three eccentric body shafts 30 is shown in FIG. 7). The input gear 20 further meshes with the distributing gear 26, and the distributing gear 26 meshes with the other input gears 20 (both not shown) provided on the other eccentric body shafts 30 respectively. That is, the three eccentric body shafts 30 (30A, 30B and 30C) are arranged which are provided with the input gears 20 (20A, 20B and 20C) respectively, the input gear 20A meshes with the pinion 14 and the distributing gear 26, and the other input gears 20B and 20C mesh with only the distributing gear 26. Additionally, the distributing gear 26 is rotatably supported by the bearings 80 and 81.

In the geared motor 2', the pulley (corresponding to the pinion) 14 is connected to an input pulley (corresponding to the input gear) 20 via a belt, and the input pulley 20 is fixed to the eccentric body shaft 30. An eccentric body shaft gear 28 is formed in the vicinity of the approximate center in an axial direction of the eccentric body shaft 30, and the eccentric body shaft gear 28 meshes with the distributing gear 26. Two eccentric body shafts 30 (not shown) are also used other than the shown shaft 30, and the eccentric body shaft gears 28 are formed on the two shafts 30 respectively to mesh with the distributing gear 26. However, the two eccentric body shafts 30 are provided with no input pulley 20. Additionally, the distributing gear 26 is rotatably supported by the bearings 80 and 81.

In a geared motor 1, rotation of a motor 10 is transmitted to all eccentric body shafts 30 via a distributing gear 26. The distributing gear 26 is constituted by a large gear to be meshed with a pinion 14 and a small gear 26A to be meshed with an input gear 20. The pinion 14 directly meshes with the distributing gear 26 of which an axis is largely gapped from that of the pinion 14, and thus a diameter of the distributing gear 26 unavoidably becomes large and a shape thereof becomes complicated, and there arises a problem in terms of cost.

In a process that the rotation of the motor 10 is transmitted to all the eccentric body shafts 30 in geared motors 2 and 2', the pinion (pulley) 14 is meshed (connected) with the input gear (input pulley) 20 provided on one eccentric body shaft 30, and then the distributing gear 26 rotates with rotation of the eccentric body shaft 30, and the other eccentric body shafts 30 rotate with the rotation of the distributing gear 26. Thus, a diameter of the distributing gear 26 can be relatively made small. However, since the three eccentric body shafts 30 do not rotate at the same time, there arises a gap due to backlash which is not preferable in terms of precision. Additionally, since only a speed reduction rate in a meshing (connecting) part between the pinion (pulley) 14 and the input gear (input pulley) 20 can be obtained, a high speed reduction ratio can be hardly realized.

SUMMARY OF THE INVENTION

The present invention was made in order to solve the above problems at the same time, and aims at providing an oscillating internally meshing type planetary gear reducer capable of realizing a low cost and the high speed reduction ratio.

In order to solve the above problems, the present invention provides an oscillating internally meshing planetary gear reducer for reducing a speed of input power via an oscillating external gear, including: an input shaft provided with an input gear which is circumscribed and meshed with a pinion rotating at the same speed as that of an output shaft of an external power source to receive driving force from the pinion; an input shaft gear mounted on the input shaft; a plurality of eccentric body shafts each provided with an eccentric body for oscillating the oscillating external gear; an eccentric body shaft gear which is mounted on at least one of the eccentric body shafts to transmit the power to the eccentric body shaft; and a distributing gear which meshes with the input shaft gear and the eccentric body shaft gear to distribute and transmit rotation of the input shaft gear to the plurality of eccentric body shaft gears.

According to the above constitution, a speed can be reduced in two stages in which the input gear receives power from the power source and the power is transmitted from the input shaft gear of the input shaft (via the distributing gear) to the eccentric body shaft gear, and a high speed reduction ratio can be realized. Additionally, in this case, it is unnecessary to make a diameter of the distributing gear large and to make a shape thereof complicated, and thus a cost can be reduced.

Additionally, a diameter of the input gear is made larger than that of the pinion and a diameter of the eccentric body shaft gear is made larger than that of the input shaft gear, and thus the high (large) speed reduction rate can be obtained.

There can be provided an oscillating internally meshing planetary gear reducer capable of realizing a low cost and a high speed reduction ratio.

DETAILED DESCRIPTION OF THE PREFERRED EMBODIMENTS

An example of embodiments of the present invention will be described in detail with reference to the accompanying drawings.

Figure 1:
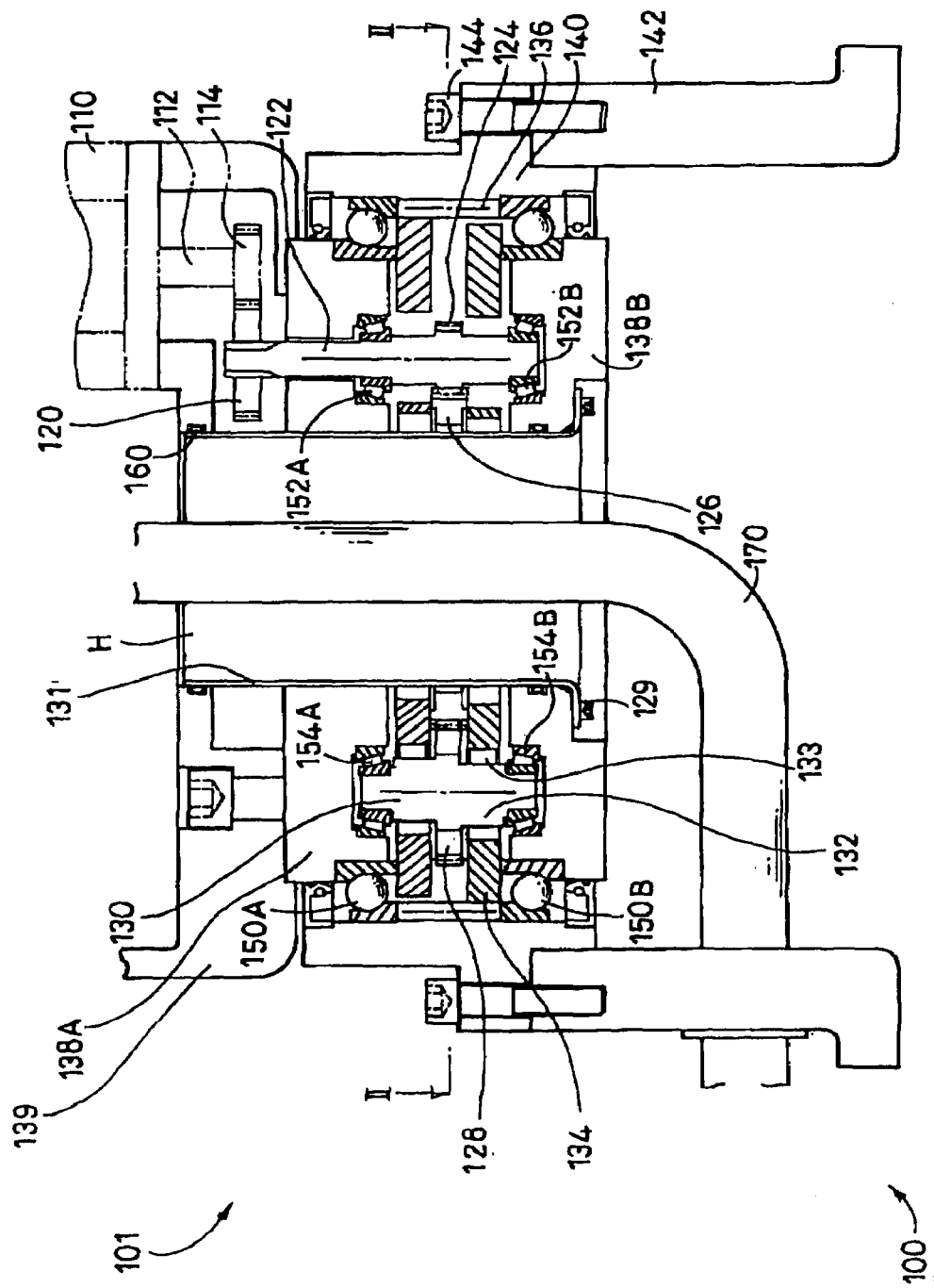
FIG. 1 is a side cross sectional view of a geared motor according to one of embodiments of the present invention.
Figure 2:
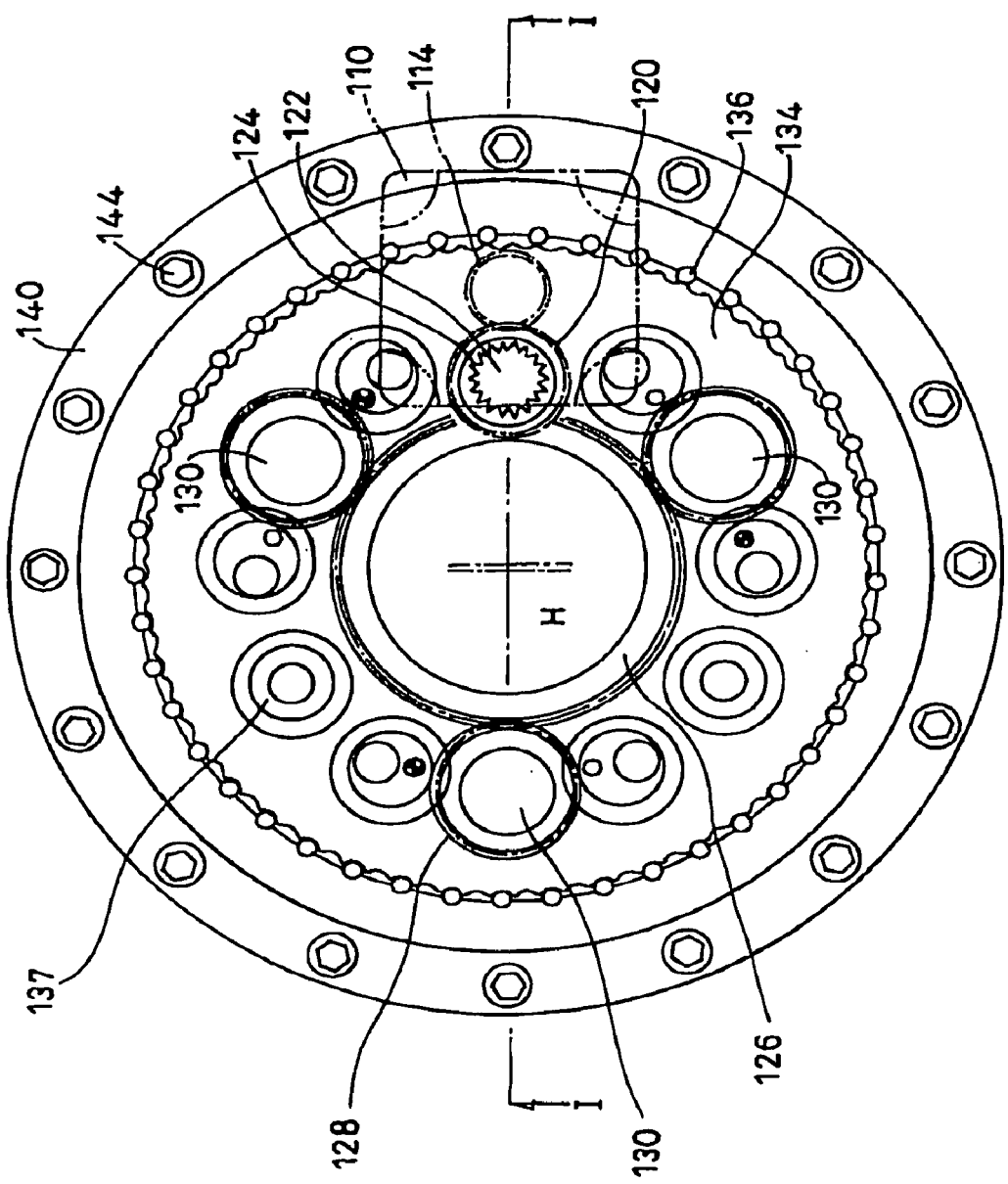
FIG. 2 is a cross sectional view taken along line II-II indicated by an arrow in FIG. 1.

FIG. 1 is a side cross sectional view of a geared motor 100 according to one of embodiments of the present invention, and FIG. 2 is a cross sectional view taken along line II-II indicated by an arrow in FIG. 1.

The geared motor 100 includes a motor 110 which serves as a power source and an oscillating internally meshing planetary gear reducer 101. The geared motor 100 is a so-called vertical type geared motor having an axis vertically provided. The motor 110 is provided on an upper surface side of a casing 140 in which a speed reducing mechanism is housed. On the other hand, a base 142 is connected to a lower surface of the casing via a bolt 144. Additionally, a hollow part H is positioned at the center of a radius direction of the geared motor 100, and can be used for running through of a cable or the like.

The hollow part H is formed along an inner circumference of a cylindrical flange 131 passing through first and second carrier bodies 138A and 138B. The cylindrical flange 131 is fixed to the second carrier body 138B with an attachment bolt 129. Additionally, O-rings 160 are interposed between the cylindrical flange 131 and a motor attachment body 139, and between the cylindrical flange 131 and the second carrier body 138B to seal up gaps therebetween, respectively, so that lubricating oil in the gear reducer 101 is not leaked outside.

Moreover, the cylindrical flange 131 does not directly contribute to power transmission, and therefore is formed to be thin. As a result, a diameter of the hollow part H can be made larger, so that more number of cables can be housed through the hollow port H.

A pinion 114 is provided on a motor shaft 112 of the motor 110 so as to rotate integrally (at equal speed) with the motor shaft 112. The pinion 114, for example, may be formed directly on the motor shaft 112, or may be fixed thereto the motor as another member. The pinion 114 is circumscribed and meshed with an input gear 120 having a diameter larger than that thereof. That is, the input gear 120 is constituted as a larger gear than the pinion 114. The input gear 120 is fixed to an input shaft 122. The input shaft 122 is arranged so as to pass through the first carrier body 138A and an oscillating external gear 134. That is, the input shaft 122 is arranged inside a pitch circle of the oscillating external gear 134. As a result, the pinion 114, which meshes with the input gear 120 fixed to the input shaft 122, can be arranged inside a pitch circle of an internal gear 136. Additionally, the input shaft 122 is supported by an input shaft bearing 152A so as to be rotatable in relation to the first carrier body 138A, and further supported by an input shaft bearing 152B so as to be rotatable in relation to the second carrier body 138B. In this embodiment, the input shaft 122 does not pass through the second carrier body 138B.

An input shaft gear 124 is formed integrally with the middle of the input shaft 122 (between the bearings for input shafts 152A and input shafts 152B for supporting the input shaft 122) in an axial direction. The input shaft gear 124 meshes with the distributing shaft gear 126. The distributing gear 126 is arranged in a float state relative to an outer circumference of the cylindrical flange (through member, cylinder) 131 which passes through the distributing gear 126 so as to wrap the hollow part H in. The float state means that the distributing gear 126 is not directly supported by a bearing.

Three eccentric body shafts 130 are arranged at positions which are different from the position of the input shaft 122 and away from each other at the phase difference of about 120° (see FIG. 2). An eccentric body shaft 128 is formed at the approximate center in an axial direction of each eccentric body shaft 130, and the eccentric body shaft gear 128 meshes with the distributing gear 126. As a result, the input shaft gear 124, the eccentric body shaft gear 128 and the distributing gear 126 are arranged on an identical (same) plane. That is, a position of the distributing gear 126 in the float state in a radius direction is regulated by the input shaft gear 124 and the three eccentric body shaft gears 128. Here, a diameter of the eccentric body shaft gear 128 is larger than that of the input shaft gear 124, and specifically the eccentric body shaft gear 128 is constituted as a large gear.

Each of eccentric bodies 132, of which eccentric directions are different from each other, is formed integrally with the eccentric body shaft 130 immediately above and just under, namely, on both sides in an axial direction of the eccentric body shaft 130. Further, each eccentric body 132 is fitted into (a hollow part of) the oscillating external gear 134 via an eccentric body bearing 133. That is, a position of the distributing gear 126 in an axial direction (vertical direction) is regulated by the two oscillating external gears 134.

The oscillating external gear 134 meshes with pin-shaped inner teeth 136 with the eccentric body 132 fitted into the hollow part of the gear 134 via the eccentric body bearing 133. The number of pin-shaped inner teeth 136 is set so as to be slightly different from the number of teeth of the oscillating external gear 134. In this embodiment, the inner teeth 136 and the casing 140 constitute an internal gear.

Each eccentric body shaft 130 is supported by an eccentric body shaft bearing 154A so as to be rotatable in relation to the first carrier 138A, and supported by an eccentric body shaft bearing 154B so as to be rotatable in relation to the second carrier 138B.

The carrier body 138 is constituted by the first carrier body 138A positioned on the upper surface side and the second carrier body 138B positioned on the lower surface side, and the carrier bodies 138A, 138B are integrally connected to each other with eight carrier pins 137 and carrier bolts (not shown) each connected to the carrier pin 137. The first carrier body 138A is supported by a carrier body bearing 150A so as to be rotatable in relation to the casing 140, and the second carrier body 138B is supported by a carrier body bearing 150B so as to be rotatable in relation to the casing 140.

Next, the action of the geared motor 100 will be described.

When the motor 110 acts, rotation of the motor shaft 112 is transmitted to the input gear 120 via the pinion 114. In this time, since the diameter of the input gear 120 is larger than that of the pinion 114 (large gear), a rotation speed of the motor shaft 112 is reduced and transmitted to the input shaft 122. The input shaft gear 124 rotates with the rotation of the input shaft 122, and the distributing gear 126 rotates which meshes with the input shaft gear 124. Since the diameter of the eccentric body shaft gear 128 is larger than that of the input shaft gear 124 (larger gear), a rotation speed of the input shaft 122 is further reduced and transmitted to the eccentric body shaft gear 128. In the geared motor 100 of this embodiment, since the rotation speed of the motor shaft 112 is thus reduced in the two stages and transmitted to the eccentric body 132, and a speed of power reduced at the high speed reduction ratio can be transmitted to a succeeding planetary gear speed reduction part (eccentric body, oscillating external gear, internal gear). That is, the high speed reduction ratio is not required to be forcibly obtained in the planetary gear speed reduction part.

Since the distributing gear 126 meshes with the three eccentric body shaft gears 128 to be connected to the three eccentric body shafts 130, the power transmitted from the input shaft 122 is distributed and transmitted to each eccentric body shaft 130 at the same time. Accordingly, there arises no gap from backlash having a possibility of being caused by distribution. Each eccentric body shaft 130 rotates by the rotation of the distributing gear 126, and the eccentric body 132 is formed integrally with each eccentric body shaft 130. Thus, eccentric rotation of the eccentric bodies 132 makes the oscillating external gear 134 oscillate and rotate. At this time, the oscillating external gear 134 meshes with the inner teeth 136 having the number of teeth slightly different from that of the gear 134, and thus almost only oscillates while slightly rotating. The oscillatory component is absorbed by the eccentric body shaft 130, and thus only a slight rotation component of the oscillating external gear 134 is transmitted and outputted to the carrier body 138.

In the embodiment, since the casing 140 is fixed by the base 142, the entirety of carrier body 138 and the motor 110 rotates by operation of the geared motor 100.

The distributing gear 126 of this embodiment is arranged in the float state as described above. However, the position of the distributing gear 126 in the radius direction is regulated by the input shaft gear 124 and the eccentric body shaft gears 128, and the position thereof in the axial direction is regulated by the two oscillating external gears 134. Thus, it is unnecessary to prepare and arrange an exclusive bearing, and a cost and a space for the bearing are unnecessary. As a result of disuse of the space for the bearing, the speed reducer can be made compact so long as a diameter of the hollow part H does not change. On the other hand, the diameter of the hollow part H can be made larger so long as the size of the speed reducer does not change.

Since the distributing gear 126 of this embodiment is arranged in the carrier body 138 (between the first and second carrier bodies 138A, 138B), the geared motor 100 can be compactly designed in an axial direction.

In this embodiment, the input shaft 122 can be arranged inside the pitch circle of the oscillating external gear 134, and the pinion 144, which meshes with the input gear 120 fixed to the input shaft 122, can be arranged inside of the pitch circle of the internal gear. As a result, even when the motor is attached as a power source, the geared motor 100 can be made compact in a radius direction, and a space for a periphery at running may be small.

Furthermore, since the input shaft 122 is supported by the first and second carrier bodies 138A, 138B through the bearings 152A, 152B, and since the input shaft gear 124 is arranged on the input shaft 122 between the bearings 152A, 152B, the input shaft gear 124 can mesh with the distributing gear 126 being supported at both ends thereof. Therefore, the input shaft gear 124 and the distributing gear 126 can mesh with each other with stability.

Next, another embodiment of the present invention will be described.

Figure 3:
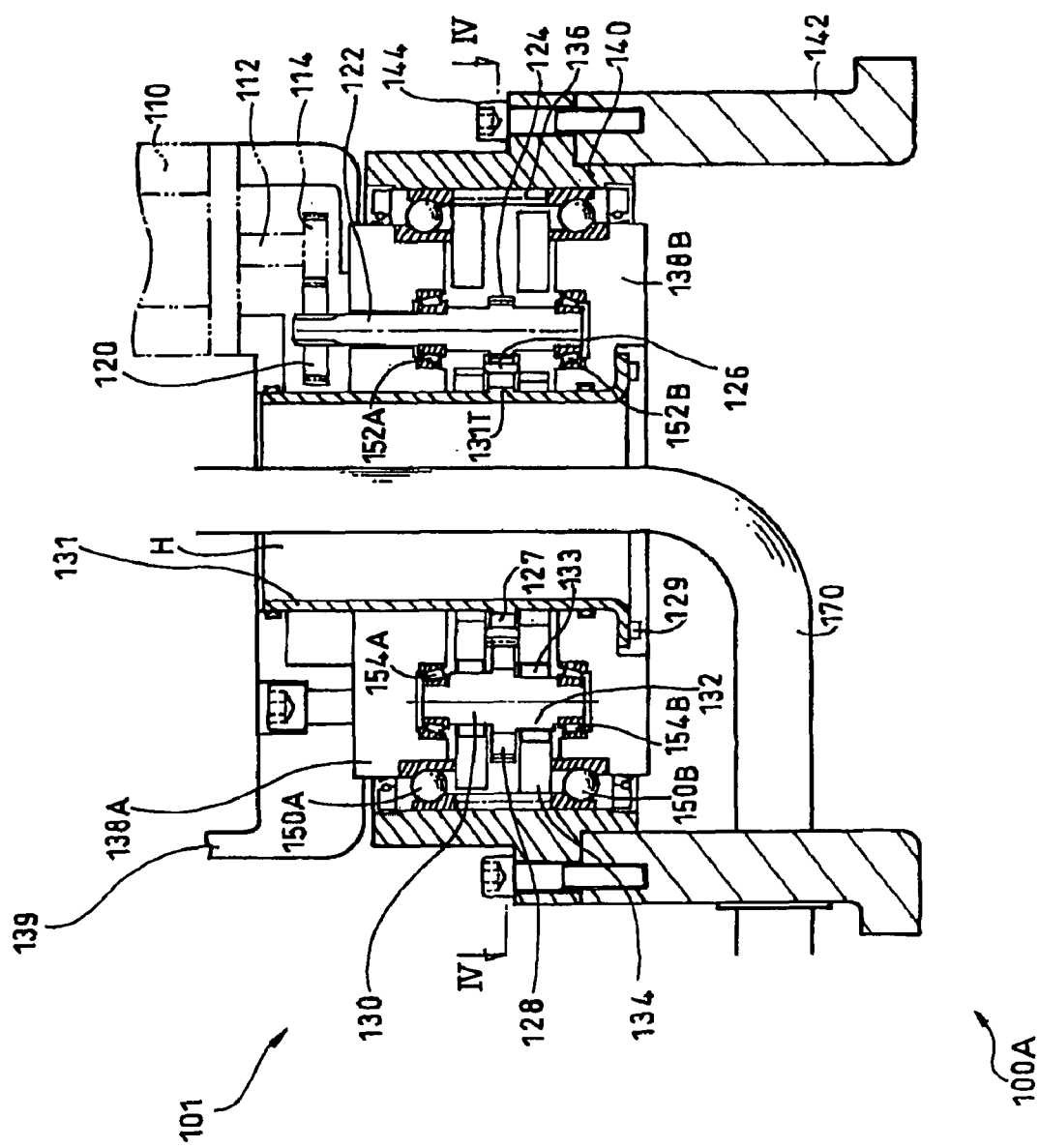
FIG. 3 is a side cross sectional view of a geared motor according to another one of embodiments of the present invention.
Figure 4:
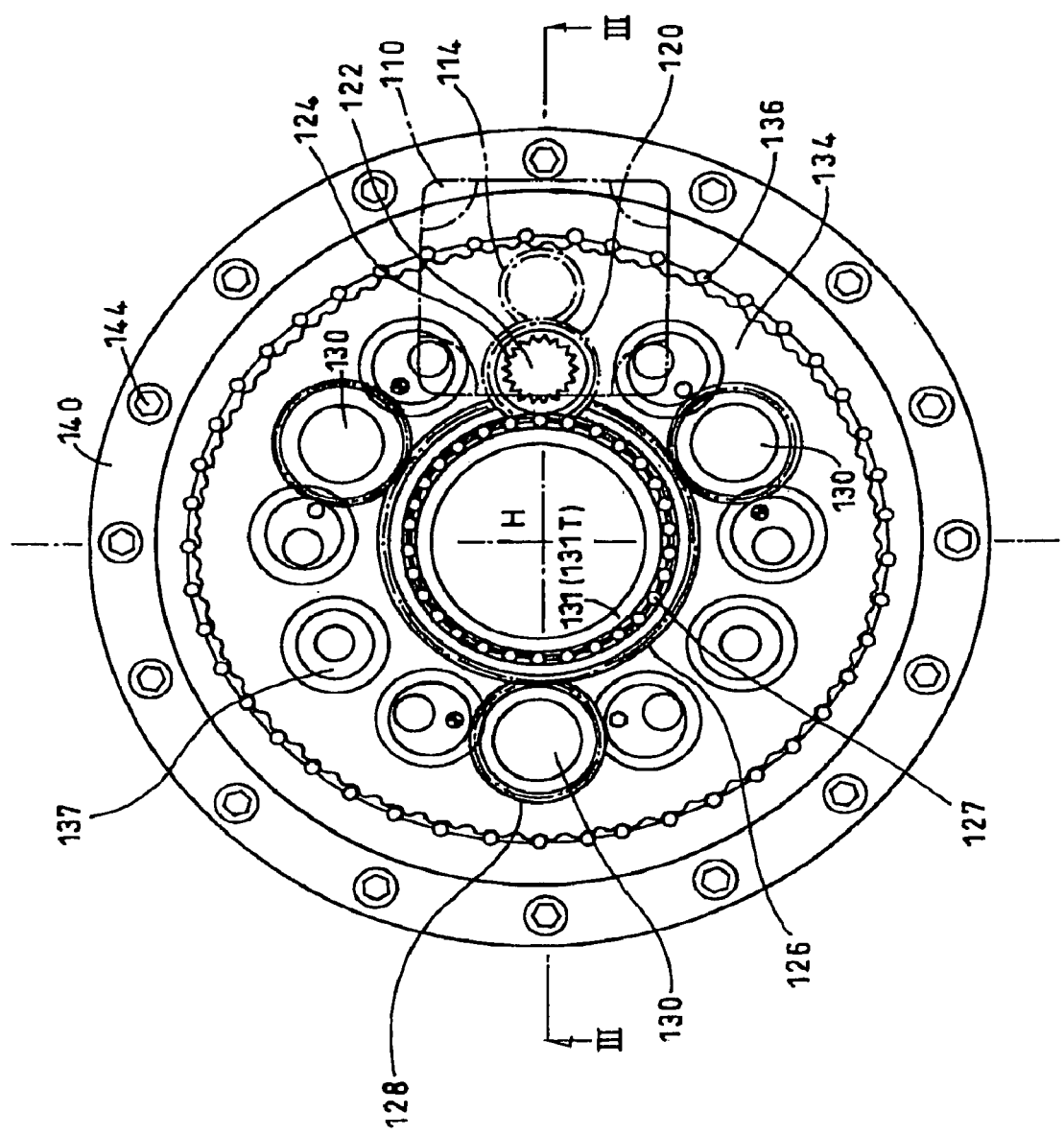
FIG. 4 is a cross sectional view taken along line IV-IV indicated by an arrow in FIG. 3.

FIG. 3 is a side cross sectional view of a geared motor 100A according to another embodiment of the present invention, and FIG. 4 is a cross sectional view taken along line IV-IV indicated by an arrow in FIG. 3.

In this embodiment, the cylindrical flange (through member: cylinder) 131 forming the hollow part H is arranged so as to pass through the distributing gear 126 in the axial direction, and the distributing gear 126 is rotatably supported by one distributing gear bearing 127 provided on the cylindrical flange 131. The distributing gear 126 is thus supported by one bearing, whereby reliable attachment rigidity and rotation stability are secured compared with the former embodiment, and a cost and a space for the bearing can be made minimum. The distributing gear bearing 127 is constituted by a plurality of rollers in the embodiment. As a result, an outer circumference surface of the cylindrical flange 131 and an inner circumference surface of the distributing gear 126 serve as a transmitting surface for the rollers. Additionally, a part, which serves as the rolling surface, of the cylindrical flange 131 is formed so as to be thicker than another part to ensure strength (cylindrical flange projecting part 131T).

If the distributing gear bearing 127 is constituted by the "rollers" like this embodiment, the diameter of the hollow part H can be made larger. For example, however, the bearing 127 can be constituted by a "ball bearing" or the like. If the ball bearing is employed, strength of an abutting part of the cylindrical flange 131 against the ball bearing (distributing gear bearing 127) is not required due to an inner ring of the ball bearing. Additionally, in order to secure strength of the rolling surface for the rollers of the cylindrical flange 131, for example, a surface treatment such as high frequency induction hardening can be employed, in addition to the method for changing the thickness of the cylindrical flange. Thus, the diameter of the hollow part H can be made larger.

The three eccentric body shafts 130 are arranged at positions which are different from the position of the input shaft 122 and away from each other at the phase difference of about 120° (see FIG. 4). The eccentric body shaft gear 128 is formed at the approximate center in the axial direction of each eccentric body shaft 130, and the eccentric body shaft gear 128 meshes with the distributing shaft 126. As a result, the input shaft gear 124, the eccentric body shaft gear 128, the distributing gear 126 and the distributing gear bearing 127 are arranged on an identical plane. Thus, the position of the distributing gear 126 in the radius direction is supported by the cylindrical flange 131 via the distributing gear bearing 127, and regulated by the input shaft gear 124 and the three eccentric body shaft gears 128.

Since the distributing gear 126, the input shaft gear 124, the eccentric body shaft gear 128 and the distributing gear bearing 127 are arranged on an identical plane, force input into the distributing gear 126 is balanced with force output from the distributing gear 126 on the identical plane. As a result, a large overturning moment is not applied to the distributing gear 126. That is, the distributing gear 126 can be rotatably supported even by "one" distributing gear bearing 127 at a high precision. Additionally, the distributing gear bearing 127 can receive an uneven radial load applied to the distributing gear 126, and thus the distributing gear 126 does not excessively vibrate and is prevented from generating a noise.

Moreover, since the other constitutions are similar to those of the former embodiment, the same symbols are only attached to the same or equal parts in the figures respectively, and description regarding the parts will be omitted.

Figure 5:
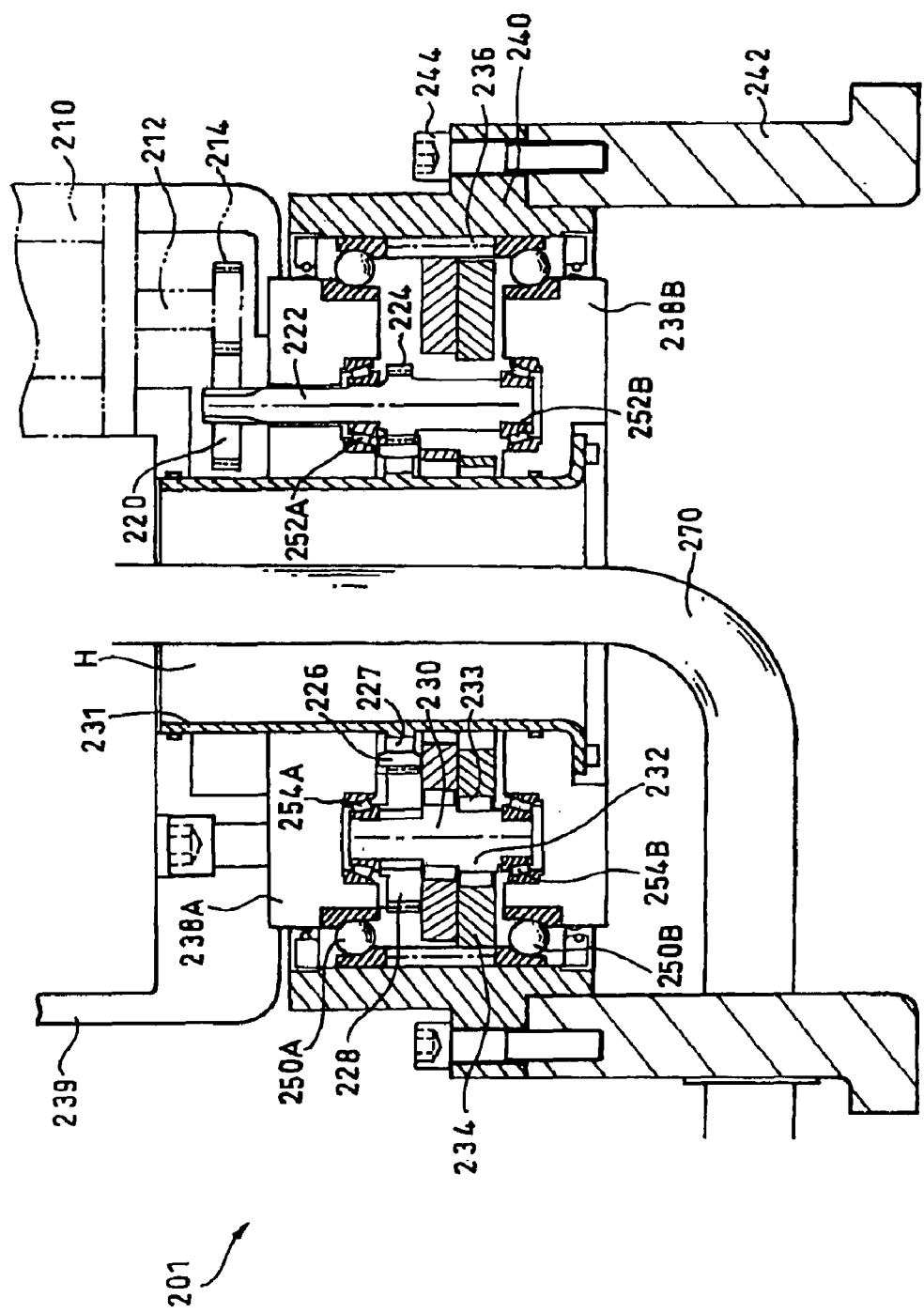
FIG. 5 is a side cross sectional view of a geared motor according to the other one of embodiments of the present invention.
Figure 6:
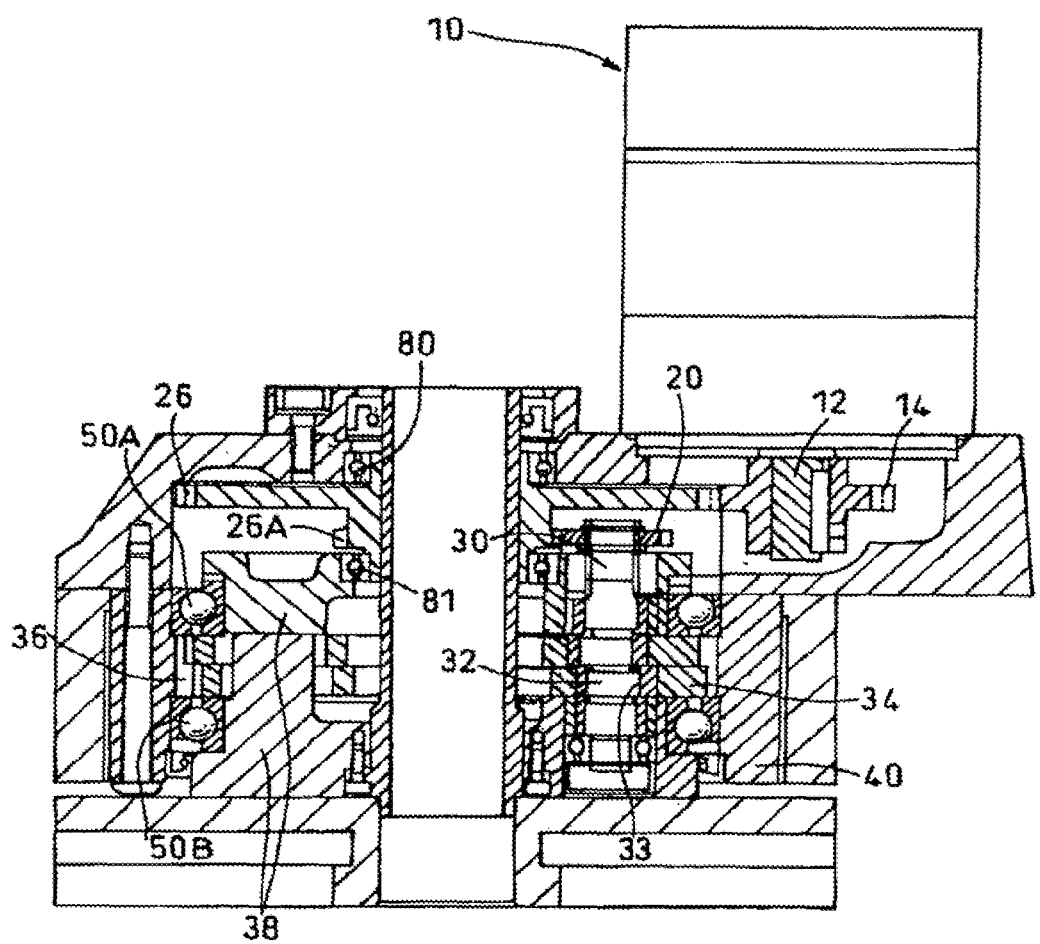
FIG. 6 is a side cross sectional view of a conventional geared motor 1.
Figure 7:
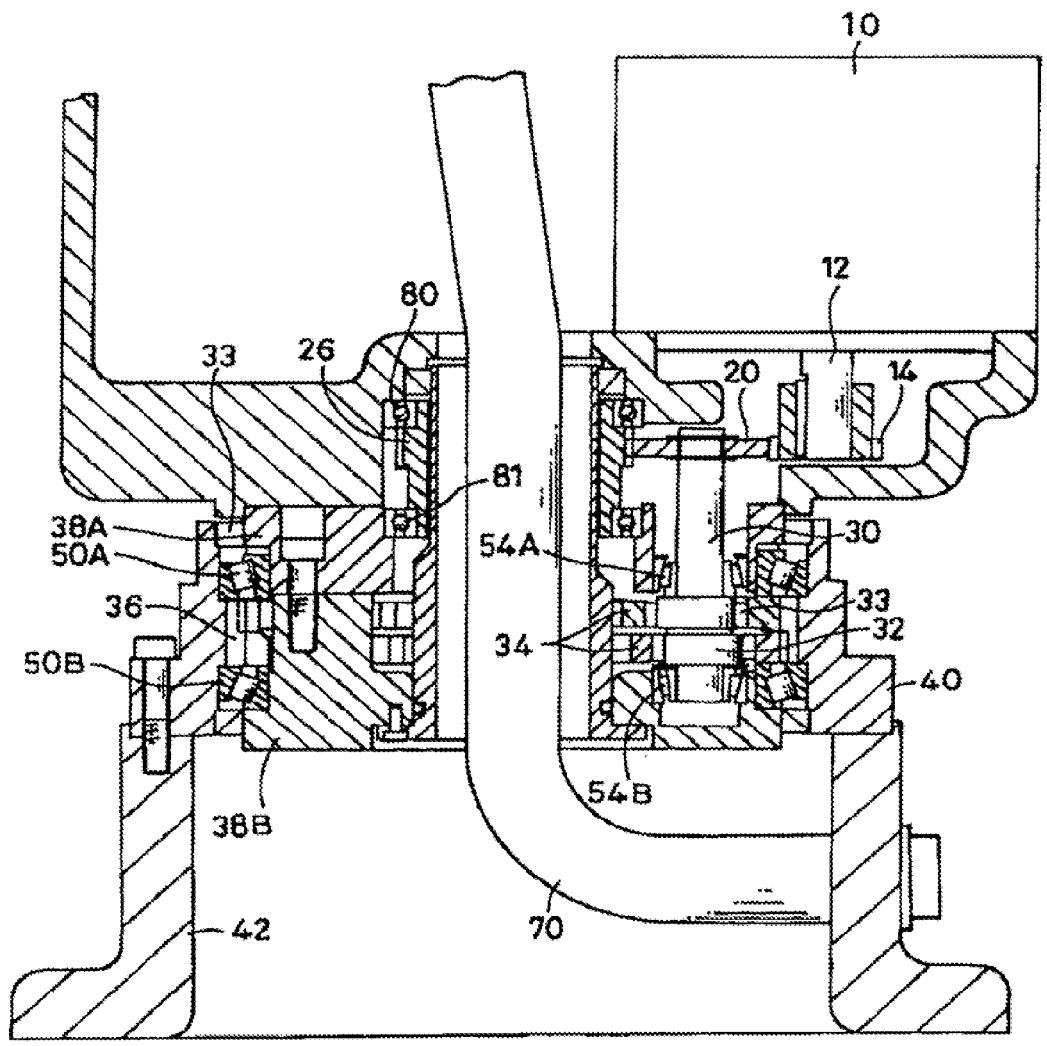
FIG. 7 is a side cross sectional view of a conventional geared motor 2.
Figure 8:
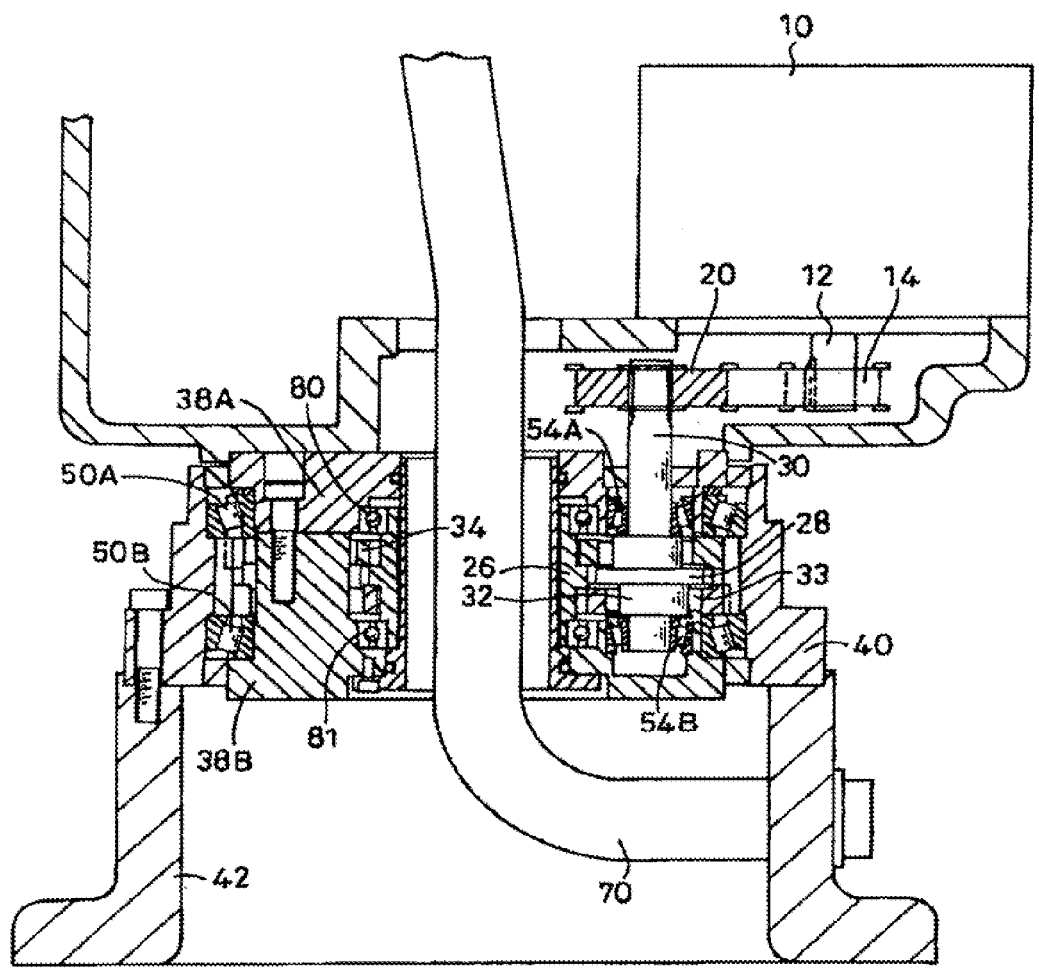
FIG. 8 is a side cross sectional view of a conventional geared motor 2'.

FIG. 5 shows another embodiment of the present invention.

In this embodiment, a distributing gear 226 is positioned between a first carrier body 238A (or a second carrier body 238B) and an oscillating external gear 234 in an axial direction. That is, a position of the distributing 226 in the axial direction may be regulated by the oscillating external gear 234 and the carrier body 238. When the distributing gear 226 is particularly arranged between the first carrier body 238A and the oscillating external gear 234, the weight of the heavy oscillating external gear 234 is not applied to the distributing gear 226, and thus slide loss can be reduced.

Since the other constitutions in FIG. 5 are similar to those of the above two embodiments, the symbols each having the same lower two digits as that of the corresponding symbol are only attached to the same or equal parts respectively, and description regarding the parts will be omitted.

Additionally, in the above described embodiments, although that number of oscillating external gears is two, it is not limited to the number, and three or more oscillating external gears may be used, or a single oscillating external gear may be used.

Additionally, although all eccentric body shaft gears serve to transmit the power, it is not limited to the constitution, and an eccentric body shaft may be provided which is driven by the oscillating external gear to be eccentrically rotated. Though the three eccentric body shafts are arranged so as to be away from each other at the phase difference of 120°, may be arranged at another phase difference. A phase difference can be properly changed depending on the number of eccentric body shafts (each on which an eccentric body shaft gear is formed) to be arranged.

Additionally, in the case where a cable or the like is not required to be arranged so as to pass through the hollow part H, the cylindrical flange may be substituted with a solid member.

Additionally, a mechanism may be employed that a shaft having a pinion is rotatably supported on the motor attachment body and the shaft is connected to the motor shaft with a spline or the like.

The present invention is particularly suitable for a joint part of an industrial robot.

The disclosure of Japanese Patent Application No. JP2006-90112 filed Mar. 29, 2006 and Japanese Patent Application No. JP 2006-103379 filed Apr. 4, 2006 including specifications, drawings and claims are incorporated herein by references in their entireties.

What is claimed is:

1. An oscillating internally meshing planetary gear reducer for reducing a speed of an input power via an oscillating external gear, comprising:
   an input gear which is circumscribed and meshed with a pinion rotating at the same speed as that of an output shaft of an external power source;
   an input shaft provided with the input gear to receive driving force from the pinion;
   an input shaft gear mounted on the input shaft;
   a plurality of eccentric body shafts each provided with an eccentric body for oscillating the oscillating external gear;
   an eccentric body shaft gear which is mounted on at least one of the eccentric body shafts to make the eccentric body shaft receive the power; and
   a distributing gear which meshes with the input shaft gear and the eccentric body shaft gear to distribute and transmit rotation of the input shaft gear to the plurality of eccentric body shaft gears.

2. The oscillating internally meshing planetary gear reducer according to claim 1, wherein the input shaft is arranged inside a pitch circle of the oscillating external gear so as to pass through the oscillating external gear.

3. The oscillating internally meshing planetary gear reducer according to claim 1, wherein the input gear has a diameter larger than that of the pinion and the eccentric body shaft gear has a diameter larger than that of the input shaft gear.

4. The oscillating internally meshing planetary gear reducer according to claim 1, wherein the pinion is arranged inside a pitch circle of an internal gear with which the oscillating external gear meshes.

5. The oscillating internally meshing planetary gear reducer according to claim 1, wherein the distributing gear is not directly supported by a bearing, and a position of the distributing gear in a radius direction is regulated by meshing of the input shaft gear and the eccentric body shaft gear.

6. The oscillating internally meshing planetary gear reducer according to claim 1, wherein the input shaft gear, the eccentric body shaft gear and the distributing gear are arranged on an identical plane.

7. The oscillating internally meshing planetary gear reducer according to claim 1, further comprising:
   a through member which passes through the distributing gear in an axial direction; and
   one bearing for supporting the distributing gear rotatably in relation to the through member.

8. The oscillating internally meshing planetary gear reducer according to claim 7, wherein the input shaft gear, the eccentric body shaft gear, the distributing gear and the bearing are arranged on an identical plane.

9. The oscillating internally meshing planetary gear reducer according to claim 7, wherein the through member is a hollow cylinder.

10. The oscillating internally meshing planetary gear reducer according to claim 7, wherein the bearing has a plurality of rollers, and an outer circumferential surface of the through member and an inner circumferential surface of the distributing gear serve as a rolling surface for the rollers.

11. The oscillating internally meshing planetary gear reducer according to claim 1,
   wherein a plurality of oscillating external gears are stacked on each other in an axial direction, and
   the distributing gear is arranged between the oscillating external gears so that a position thereof in an axial direction is regulated.

12. The oscillating internally meshing planetary gear reducer according to claim 1, wherein the distributing gear is arranged between the oscillating external gear and a carrier body for taking out a rotation component of the oscillating external gear so that a position thereof in an axial direction is regulated.

* * * * *